United States Patent [19]

Boatwright

[11] Patent Number: 5,158,740
[45] Date of Patent: Oct. 27, 1992

[54] FUEL ROD END PLUG WELDING METHOD

[75] Inventor: David A. Boatwright, Columbia, S.C.

[73] Assignee: Westinghouse Electric Corp., Pittsburgh, Pa.

[21] Appl. No.: 740,343

[22] Filed: Aug. 5, 1991

[51] Int. Cl.⁵ .............................................. G21C 3/10
[52] U.S. Cl. .................................... 376/261; 376/451
[58] Field of Search ................ 376/451, 261, 260; 976/DIG. 46, DIG. 47; 29/723, 906; 219/60 R

[56] References Cited

U.S. PATENT DOCUMENTS

| | | | |
|---|---|---|---|
| 3,725,635 | 4/1973 | Fink et al. | 219/121 P |
| 3,836,431 | 9/1974 | Flipot et al. | 376/451 |
| 3,842,238 | 10/1974 | Boyko et al. | 219/137 |
| 4,003,788 | 1/1977 | Boyko et al. | 376/451 |
| 4,554,128 | 11/1985 | Parker et al. | 376/252 |
| 4,587,094 | 5/1986 | Bucher | 376/451 |
| 4,642,217 | 2/1987 | Wilson et al. | 376/451 |
| 4,716,018 | 12/1987 | Boatwright et al. | 376/451 |
| 4,747,997 | 5/1988 | Boatwright | 376/261 |
| 4,837,419 | 6/1989 | Boatwright et al. | 219/125.11 |
| 4,921,663 | 5/1990 | Boatwright | 376/451 |

*Primary Examiner*—Daniel D. Wasil

[57] ABSTRACT

A trepan is provided in a flat end face of an end plug about an external opening of an axial bore through the end plug. The trepan includes an annular groove encircling the external opening and an annular end face portion extending between the annular groove and the external opening. The ratio of the depth of the groove to the diameter of the annular end face portion of the trepan is within a range of from about 1:3 to 1:6. The ratio of the depth of the groove to the width thereof is within a range of from about 1:1 to 1:2. When an axially-directed welding arc is applied to the trepan in the flat end face of the end plug a melting of the material of the trepan into the end face occurs which forms a weld seal such that the trepan is replaced by a shallow concavity overlying the weld seal and extending across the region substantially encircled originally by the annular groove of the trepan.

7 Claims, 2 Drawing Sheets

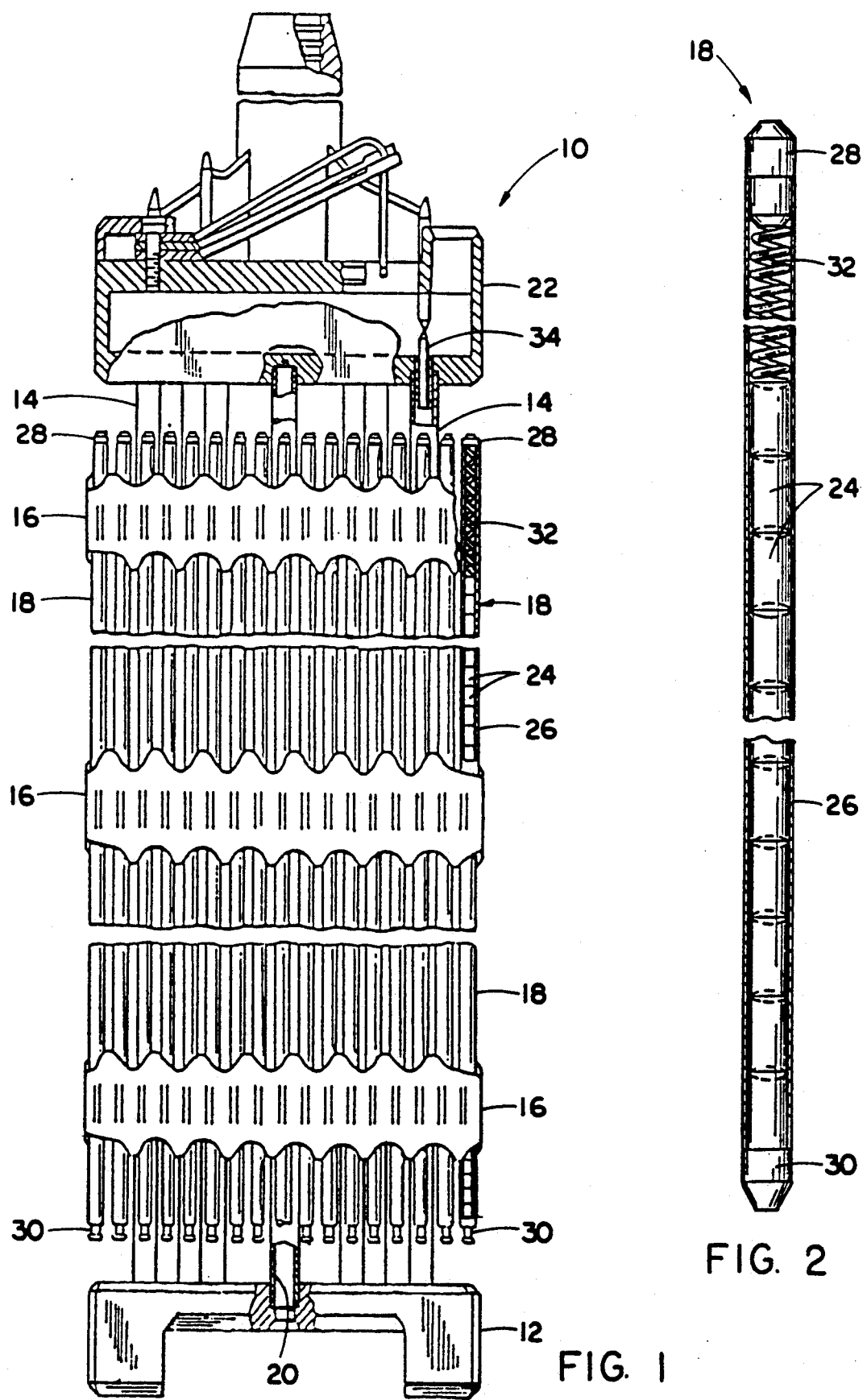

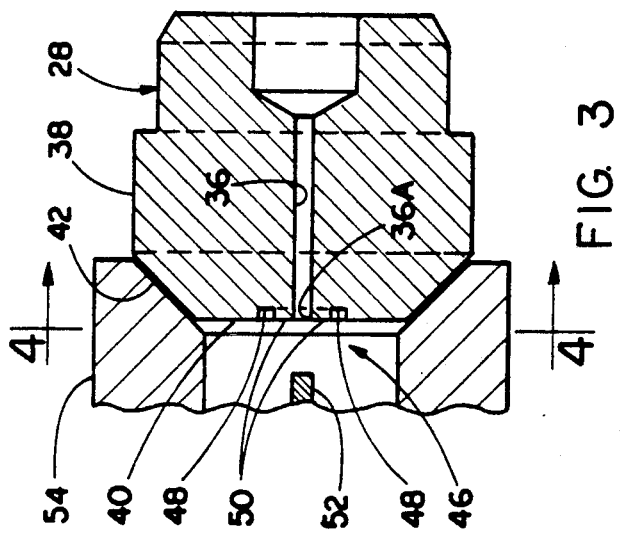
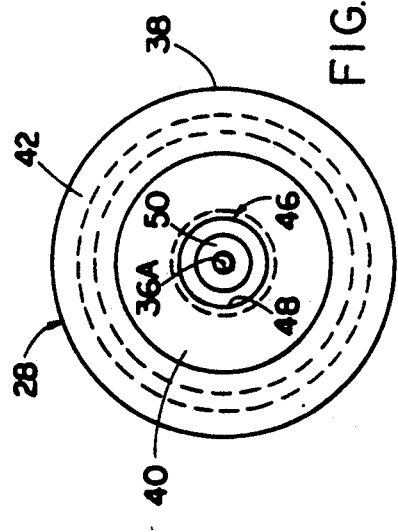
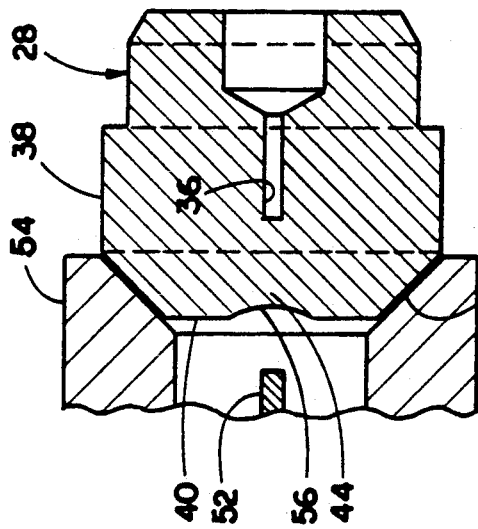

FUEL ROD END PLUG WELDING METHOD

BACKGROUND OF THE INVENTION

1. Field of the Invention

The present invention relates generally to nuclear fuel rods and, more particularly, is concerned with a method of welding a gas pressurization axial passage in an end plug and a trepan configuration provided on the end face of the end plug.

2. Description of the Prior Art

In a typical nuclear reactor, such as a pressurized water type, the reactor core includes a large number of fuel assemblies each of which is composed of top and bottom nozzles with a plurality of elongated transversely spaced guide thimbles extending longitudinally between the nozzles and a plurality of transverse support grids axially spaced along and attached to the guide thimbles. Also, each fuel assembly is composed of a plurality of elongated fuel elements or rods transversely spaced apart from one another and from the guide thimbles and supported by the transverse grids between the top and bottom nozzles. The fuel rods each contain fissile material and are grouped together in an array which is organized so as to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

Each fuel rod includes a plurality of nuclear fuel pellets loaded into a cladding tube and bottom and top end plugs applied to opposite ends of the tube to hermetically seal the tube. The bottom and top end plugs are typically girth welded to the opposite ends of the tube. Ordinarily, the top end plug also contains an axial gas pressurization passage or bore. An axial electrode is used to form an end seal weld on the end face of the top end plug to close the axial bore after pressurization of the tube with an inert fill gas.

It is well established that, when using TIG (tungsten inert gas) welding, the arc tends to start on external corners of the end plug due to the concentration of ions at these points. Since the typical top end plug has a flat end face, arc initiation and location of the arc is not always on the center of the plug. It is desirable for the arc to strike as close on true center as possible to produce a high quality weld.

Consequently, there is a need for improvements which will promote better centering, uniformity, and depth of the end seal weld on the top end plug.

SUMMARY OF THE INVENTION

The present invention provides a fuel rod end plug welding method and end face configuration designed to satisfy the aforementioned needs. In accordance with the present invention, the upper end plug is provided with a shallow annular groove forming a trepan on its flat end face which encircles the external opening of the gas pressurization bore formed axially through the end plug. The depth of the groove and the diameter of the end face portion encircled by the groove (e.g. the size relationships of the components of the trepan) must bear a ratio within a particular range to produce a quality end seal weld.

More particularly, the ratio of the depth of the groove to the diameter of the annular end face portion of the trepan is within a range of from about 1:3 to 1:6. Preferably, the depth-to-diameter ratio is approximately 1:5. Further, the ratio of the depth of the groove to its width is within a range of from about 1:1 to 1:2.

Application of an axially-directed welding arc to the trepan on the flat end face having these size relationships produces centering of the weld and melting of the material of the trepan into the end face such that the trepan is replaced by a shallow concavity across the region originally encircled by the annular groove.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is an elevational view, partly sectioned and broken away, of a prior art nuclear fuel assembly.

FIG. 2 is an enlarged longitudinal view of one of the fuel rods removed from the fuel assembly of FIG. 1, showing the fuel rod in vertically foreshortened and partly sectioned form.

FIG. 3 is an axial sectional view of an end plug stop assembly and an end seal axial welding electrode in position before completing an end seal weld at the trepan of the top end plug.

FIG. 4 is an end view of the top end plug alone as seen along line 4—4 of FIG. 3, showing the configuration of the flat end face before carrying out the end seal welding operation.

FIG. 5 is an axial sectional view similar to that of FIG. 3, but after completing the end seal weld at the trepan of the top end plug.

DETAILED DESCRIPTION OF THE INVENTION

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a conventional nuclear reactor fuel assembly, represented in vertically foreshortened form and generally designated by the numeral 10. Being the type use in a pressurized water nuclear reactor (PWR), the fuel assembly 10 basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14. With such an arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the grids 16 spaced along the fuel assembly length. As seen in FIG. 1 and in greater detail in FIG. 2, each fuel rod 18 includes a plurality of nuclear fuel pellets 24 disposed in a stack in an elongated hollow cladding tube 26 having its opposite ends closed by top and bottom end plugs 28, 30 so as to hermetically seal the tube 26. Commonly, a plenum spring 32 is disposed within the cladding tube 26 between the top end plug 28 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work. To control the fission process, a number of control rods 34 are reciprocally movable in the guide thimbles 14 located at predetermined positions in the fuel assembly 10.

Fuel Rod End Plug Welding Method

The top and bottom end plugs 28, 30 are typically girth welded to the opposite ends of the cladding tube 26. Also, the top end plug 28 typically contains an axial gas pressurization passage or bore 36 which is used after completion of the girth welding to evacuate gases from the interior of the tube 26 and then to fill the tube with a suitable inert gas before the bore 36 is sealed. Suitable welding apparatus for carrying out both girth and end seal welding is illustrated and described in U.S. Pat. No. 4,837,419 to Anthony E. Boatwright et al, assigned to the assignee of the present invention, the disclosure of which is incorporated herein by reference.

Referring to FIGS. 3 and 4, the top end plug 28 includes a generally cylindrical body 38 having an exterior flat end face 40 with the axial bore 36 extending through the plug body 38 and terminating in an external opening 36A defined on the flat end face 40. The flat end face 40 is bounded by an exterior conical peripheral face 42.

In accordance with the present invention, in order to facilitate the fabrication of a quality seal weld 44 at the outer portion of the bore 36 and its opening 36A, a trepan 46 is defined in the flat end face 40 of the end plug 28 about the external opening 36A of the axial bore 36. The trepan 46 is composed by an annular groove 48 encircling and spaced radially outward from the external opening 36A and an annular end face portion 50 extending between the annular groove 48 and the external opening 36A.

The depth of the groove 48 and the diameter of the end face portion 50 encircled by the groove 48, that is, the components of the trepan 46, must bear a ratio to one another within a particular range to produce the end seal weld 44 of optimum quality. The ratio of the depth of the groove 48 to the diameter of the annular end face portion 50 of the trepan 46 is within a range of from about 1:3 to 1:6, and is preferably about 1:5. The ratio of the depth of the groove 48 to its width is within a range of from about 1:1 to 1:2. The range of ratios between the depth and diameter were developed by trial and error tests to determine which values achieve the best centering of the welding arc and most satisfactory melting of the portion 50. When the stated proportions are produced on an end plug, the geometry of the plug causes a centering of the weld puddle, and thereby uniform depth of penetration of the weld, resulting in a higher quality weld to close the seal hole and inner fuel rod integrity.

Briefly, the theory of operation of the trepan 46 in producing an optimum quality seal weld 44 is as follows. The material of the annular end face portion 50 receives the welding arc and melts and flows outwardly. However, the melt flow collides with the outer wall 48A of the groove 48 which acts as a cold obstruction, compared to the melt temperature. The effect of the cold obstruction is to break up the surface tension of the melt and better centralize the weld 44.

Referring to FIGS. 3-5, there is illustrated a portion of the arrangement of the cited U.S. patent for carrying out the end seal welding and thereby sealing of the axial bore 36 of the top end plug 28. The illustrated arrangement includes an axial welding electrode 52 and an end plug stop 54. The axial welding electrode 52 used to form the end seal weld 44 is positioned in axially spaced relation from the trepan 46 on the end face 40 of the end plug 28. The end plug stop 54 is positioned against the conical peripheral face 42 of the end plug 28 in outward radially spaced relation from the trepan 46. Therefore, the stop 54 does not engage in the groove 48 of the trepan 46. When an axially-directed welding arc is applied by the axial electrode 52 to the trepan 46 in the flat end face 40 of the end plug 28, centering of the arc on the trepan 46 results and a melting of the material of the trepan into the end face 40 is produced such that the trepan 46 of FIGS. 3 and 4 is replaced by a shallow concavity 56 extending across the region substantially encircled originally by the annular groove 48 of the trepan 46. The concavity 56 lies over the exterior of the resultant weld 44.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely an exemplary embodiment thereof.

I claim:

1. A method of weld sealing an external opening of an axial gas pressurization bore on a flat end face of an end plug on a cladding tube, said method comprising the steps of:
   (a) providing a trepan in the flat end face of the end plug about the external opening of the axial bore, said trepan including an annular groove encircling the external opening and an annular end face portion extending between said annular groove and said external opening; and
   (b) applying an axially-directed welding arc to said trepan in the flat end face of the end plug so as to produce a melting of the material of said trepan into the end face and formation of a weld seal in the bore such that said trepan is replaced by a shallow concavity overlying the weld seal and extending across the region substantially encircled originally by said annular groove of said trepan;

(c) said applying including positioning an axial welding electrode in axially spaced relation from said trepan on the end face of said end plug, by positioning an end plug stop to make continuous annular contact against the periphery of the end plug in outward radially spaced relation from said trepan.

2. The method as recited in claim 1, wherein the ratio of the depth of said groove to the diameter of said annular end face portion of said trepan is within a range of from about 1:3 to 1:6.

3. The method as recited in claim 1, wherein the ratio of the depth of said groove to the diameter of said annular end face portion of said trepan is approximately 1:5.

4. The method as recited in claim 1, wherein the ratio of the depth of said groove to the width thereof is within a range of from about 1:1 to 1:2.

5. A method of weld sealing an external opening of an axial gas pressurization bore on a flat end face of an end plug on a cladding tube, said method comprising the steps of:

(a) providing a trepan in the flat end face of the end plug about the external opening of the axial bore, said trepan including an annular groove encircling the external opening and an annular end face portion extending between said annular groove and said external opening, the ratio of the depth of said groove to the diameter of said annular end face portion of said trepan being within a range of from 1:3 to 1:6; and (b) applying an axially-directed welding arc to said trepan in the flat end face of the end plug so as to produce a melting of the material of said trepan into the end face and formation of a weld seal in the bore such that said trepan is replaced by a shallow concavity overlying the weld seal and extending across the region substantially encircled originally by said annular groove of said trepan;

(c) said applying including positioning an end plug stop to make continuous annular contact against the periphery of the end plug in an outward radially spaced relation from said trepan on the end face of said end plug and positioning an axial welding electrode in axially spaced relation from said trepan.

6. The method as recited in claim 5, wherein the ratio of the depth of said groove to the diameter of said annular end face portion of said trepan is approximately 1:5.

7. The method as recited in claim 5, wherein the ratio of the depth of said groove to the width thereof is within a range of from about 1:1 to 1:2.

* * * * *